(12) United States Patent
Yokoyama

(10) Patent No.: US 11,263,999 B2
(45) Date of Patent: Mar. 1, 2022

(54) IMAGE PROCESSING DEVICE AND CONTROL METHOD THEREFOR

(71) Applicant: CANON KABUSHIKI KAISHA, Tokyo (JP)

(72) Inventor: Hokuto Yokoyama, Sakai (JP)

(73) Assignee: Canon Kabushiki Kaisha, Tokyo (JP)

( * ) Notice: Subject to any disclaimer, the term of this patent is extended or adjusted under 35 U.S.C. 154(b) by 78 days.

(21) Appl. No.: 16/693,813

(22) Filed: Nov. 25, 2019

(65) Prior Publication Data

US 2020/0090629 A1 Mar. 19, 2020

Related U.S. Application Data

(63) Continuation of application No. PCT/JP2018/021199, filed on Jun. 1, 2018.

(30) Foreign Application Priority Data

Jun. 8, 2017 (JP) .............................. JP2017-113636

(51) Int. Cl.
*G09G 5/38* (2006.01)
*G09G 5/10* (2006.01)

(52) U.S. Cl.
CPC ................. *G09G 5/38* (2013.01); *G09G 5/10* (2013.01); *G09G 2340/0471* (2013.01); *G09G 2340/0478* (2013.01); *G09G 2354/00* (2013.01)

(58) Field of Classification Search
CPC .... G09G 5/38; G09G 5/10; G09G 2340/0471; G09G 2340/0478; G09G 2354/00
See application file for complete search history.

(56) References Cited

U.S. PATENT DOCUMENTS 4,688,081 A * 8/1987 Furuhata ................ H04N 9/896
348/498
5,142,354 A * 8/1992 Suzuki .................... H04N 9/72
348/677

(Continued)

FOREIGN PATENT DOCUMENTS

CN 101682746 A 3/2010
CN 102375234 A 3/2012

(Continued)

OTHER PUBLICATIONS

Mar. 15, 2021 European Search Report in European Patent Appln. No. 18814371.3.

(Continued)

*Primary Examiner* — Jitesh Patel
(74) *Attorney, Agent, or Firm* — Venable LLP

(57) ABSTRACT

Enabling generation of a display image giving less uncomfortable feeling. An image processing device comprises: an input unit configured to receive, as an image signal and a synchronizing signal, a frame image constituting a moving image; an acceptance unit configured to accept an image shift instruction instructing a change of a display position of the frame image in a vertical direction of a given display unit; a correction unit configured to correct the synchronizing signal on the basis of the image shift instruction; and an output unit configured to output the image signal and the corrected synchronizing signal in association with each other. If an image shift amount in the vertical direction included in the image shift instruction exceeds a predetermined amount, the correction unit performs correction corresponding to an image shift amount not more than the predetermined amount.

19 Claims, 11 Drawing Sheets

(56) References Cited

U.S. PATENT DOCUMENTS

| | | | |
|---|---|---|---|
| 5,818,416 A * | 10/1998 | Hwang | G06T 3/4084 345/667 |
| 6,011,526 A | 1/2000 | Toyoshima et al. | |
| 6,943,783 B1 | 9/2005 | Ting et al. | |
| 8,750,380 B2 | 6/2014 | Matsubayashi | |
| 9,124,817 B2 | 9/2015 | Ishii et al. | |
| 9,398,219 B2 | 7/2016 | Kenjo | |
| 9,488,757 B2 | 11/2016 | Mukawa | |
| 9,741,091 B2 | 8/2017 | Satori et al. | |
| 9,741,175 B2 | 8/2017 | Mukawa | |
| 9,918,058 B2 | 3/2018 | Takahashi et al. | |
| 9,930,258 B2 | 3/2018 | Kenjo | |
| 9,964,766 B2 | 5/2018 | Kon et al. | |
| 10,108,018 B2 | 10/2018 | Takahashi et al. | |
| 10,228,766 B2 | 3/2019 | Bhesania et al. | |
| 10,678,415 B2 | 6/2020 | Cho | |
| 2002/0180769 A1 * | 12/2002 | Yin | G09G 1/165 345/699 |
| 2005/0156817 A1 | 7/2005 | Iba | |
| 2005/0285961 A1 * | 12/2005 | Kokubo | H04N 5/3765 348/312 |
| 2006/0284881 A1 * | 12/2006 | Suzuki | G09G 5/005 345/589 |
| 2010/0329339 A1 | 12/2010 | Kanagawa | |
| 2011/0134252 A1 * | 6/2011 | Furukawa | H04N 5/44504 348/177 |
| 2011/0310223 A1 * | 12/2011 | Pai | H04N 13/341 348/43 |
| 2012/0032874 A1 | 2/2012 | Mukawa | |
| 2012/0099008 A1 * | 4/2012 | Horikawa | H04N 5/367 348/246 |
| 2013/0231782 A1 | 12/2013 | Ishii | |
| 2015/0042826 A1 | 2/2015 | Kenjo | |
| 2015/0062206 A1 | 3/2015 | Osborne | |
| 2015/0293362 A1 | 10/2015 | Takahashi et al. | |
| 2016/0077592 A1 | 3/2016 | Bhesania et al. | |
| 2016/0261880 A1 | 9/2016 | Lee et al. | |
| 2016/0282618 A1 | 9/2016 | Kon et al. | |
| 2016/0295114 A1 | 10/2016 | Kenjo | |
| 2017/0039772 A1 | 2/2017 | Mukawa | |
| 2017/0127032 A1 | 5/2017 | Takahashi et al. | |
| 2017/0169540 A1 | 6/2017 | Satori et al. | |
| 2017/0336955 A1 | 11/2017 | Cho | |
| 2020/0257441 A1 | 8/2020 | Cho | |

FOREIGN PATENT DOCUMENTS

| | | |
|---|---|---|
| CN | 104349082 A | 2/2015 |
| CN | 104423835 A | 3/2015 |
| CN | 104781873 A | 7/2015 |
| CN | 105474302 A | 4/2016 |
| CN | 106464826 A | 2/2017 |
| CN | 106796773 A | 5/2017 |
| EP | 2378347 A | 10/2011 |
| JP | H08-019004 A | 1/1996 |
| JP | H08-023486 A | 1/1996 |
| JP | H09-284676 A | 10/1997 |
| JP | H11-202257 A | 7/1999 |
| JP | 2004-109994 A | 4/2004 |
| JP | 2013-254029 A | 12/2013 |
| JP | 2014-078022 A | 5/2014 |
| JP | 2017-085393 A | 5/2017 |
| WO | 2004/021699 A1 | 3/2004 |
| WO | 2015/174501 A1 | 11/2015 |
| WO | 2016/099141 A2 | 6/2016 |

OTHER PUBLICATIONS

Feb. 24, 2021 Chinese Official Action in Chinese Patent Appln. No. 201880037345.0.
CN 102375234 A, US 2012/0032874 A1 US 2017/0039772 A1 U.S. Pat. No. 9,488,757 B2 U.S. Pat. No. 9,741,175 B2.
WO 2004/021699 A1, US 2005/0156817 A1, US 2005/0156817 A1 was cited in Nov. 25, 2019 IDS.
CN 104423835 A, US 2015/0062206 A1.
CN 106796773 A, U.S. Pat. No. 10,228,766 B2 US 2016/0077592 A1.
CN 104781873 A, U.S. Pat. No. 10,108,018 B2 US 2015/0293362 A1.
CN 105474302 A, US 2016/0282618 A1 U.S. Pat. No. 9,964,766 B2.
CN 101682746 A, US 2010/0329339 A1 U.S. Pat. No. 8,750,380 B2.
CN 106464826 A, US 2017/0127032 A1 U.S. Pat. No. 9,918,058 B2.
CN 104349082 A, US 2015/0042826 A1 US 2016/0295114 A1 U.S. Pat. No. 9,398,219 B2 U.S. Pat. No. 9,930,258 B2.
WO 2016/099141 A2, U.S. Pat. No. 10,678,415 B2 US 2017/0336955 A1 US 2020/0257441 A1.
WO 2015/174501 A1, US 2017/0169540 A1 U.S. Pat. No. 9,741,091 B2.
Aug. 14, 2018 International Search Report in International Patent Appln. No. PCT/JP2018/021199.

* cited by examiner

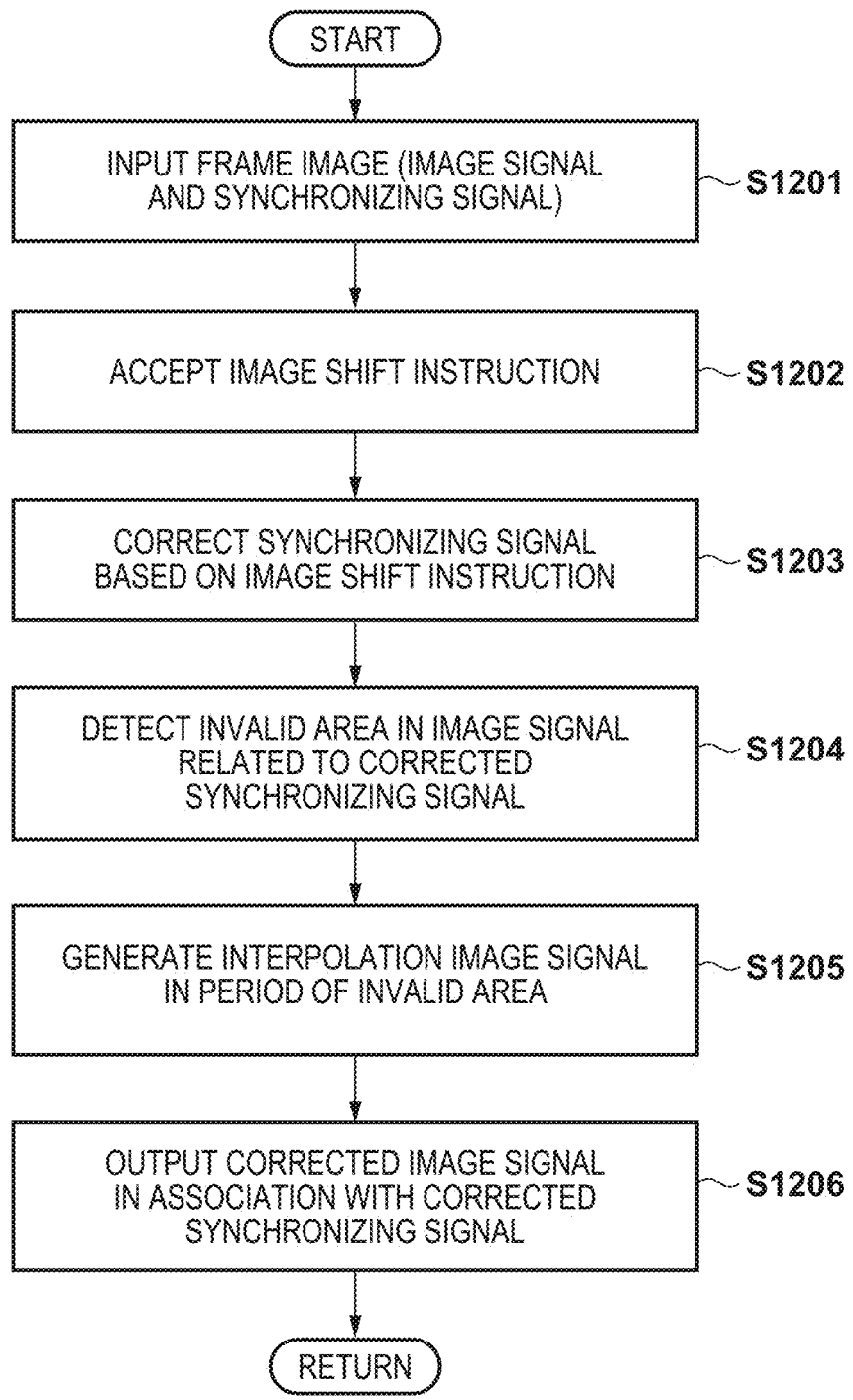

IMAGE PROCESSING DEVICE AND CONTROL METHOD THEREFOR

CROSS-REFERENCE TO RELATED APPLICATIONS

This application is a Continuation of International Patent Application No. PCT/JP2018/021199, filed Jun. 1, 2018, which claims the benefit of Japanese Patent Application No. 2017-113636, filed Jun. 8, 2017, both of which are hereby incorporated by reference herein in their entirety.

BACKGROUND OF THE INVENTION

Field of the Invention

The present invention relates to an image processing technique of generating an image obtained by shifting an input image in a vertical direction and/or a horizontal direction.

Background Art

In recent years, a system including an HMD (Head Mounted Display) has received attention. The HMD is used as a visual display device of an MR (Mixed Reality) system or a VR (Virtual Reality) system. As one of the MR techniques, there is known a technique that uses a video see-through type HMD so that an HMD user can observe an image in which CG (Computer Graphics) is superimposed and displayed on an object image observed from the pupil position of the HMD user. On the other hand, in the VR technique, there is known a technique that uses an HMD equipped with a posture sensor, which detects the moving direction of user's head, to generate and display a visual image of a virtual space based on the head direction data detected by the posture sensor.

In the MR system, ideally, capturing an object image from the viewpoint (pupil position) of the HMD user and displaying the image with CG superimposed thereon should be performed simultaneously. However, in reality, it takes time (assume the total time to be $\Delta t$) to perform image processing on a captured camera image and arithmetic processing for CG rendering. Similarly, the VR system requires a time ($\Delta t$) from detection of the head direction data to display of a visual image. Thus, when the user has moved his/her head, the display image moves following the change in head direction after the time $\Delta t$ has elapsed. This gives an uncomfortable feeling to the user.

In order to reduce the uncomfortable feeling due to the delay, PTL 1 proposes a technique of horizontally shifting the position of an aerial image displayed on a display unit in accordance with the direction displacement amount, which is a difference between the current head direction data and the head direction data before a certain time. Further, PTL 2 proposes a technique of shifting an image by shifting the timing of a horizontal synchronizing signal based on an image signal.

CITATION LIST

Patent Literature

PTL 1: Japanese Patent Application Laid-Open No. 2004-109994
PTL 2: Japanese Patent Application Laid-Open No. 2014-78022

However, when the timing of a synchronizing signal is shifted as described in PTL 2 described above, image disturbance such as image discontinuation/deviation in the middle of a frame image may occur depending on conditions. This causes a problem that the HMD user feels uncomfortable with the display image.

The present invention has been made in consideration of the above-described problems, and provides a technique that enables generation of a display image giving a less uncomfortable feeling.

SUMMARY OF THE INVENTION

In order to solve the above-described problems, an image processing device according to the present invention includes the following arrangement. That is, the image processing device comprises:

an input unit configured to receive, as an image signal and a synchronizing signal, a frame image constituting a moving image;

an acceptance unit configured to accept an image shift instruction instructing a change of a display position of the frame image in a vertical direction of a given display unit;

a correction unit configured to correct the synchronizing signal on the basis of the image shift instruction; and an output unit configured to output the image signal and the corrected synchronizing signal in association with each other, wherein if an image shift amount in the vertical direction included in the image shift instruction exceeds a predetermined amount, the correction unit performs correction corresponding to an image shift amount not more than the predetermined amount.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is another flowchart illustrating a series of operations of the image shift processing unit.

DESCRIPTION OF THE EMBODIMENTS

Examples of embodiments of the present invention will be explained in detail below with reference to the accompanying drawings. Note that the following embodiments are merely examples, and are not intended to limit the scope of the present invention.

First Embodiment

The first embodiment of an image shift device according to the present invention will be described below by taking an MR/VR system as an example.

An MR system includes an HMD including an image capturing unit and a display unit, and a PC to superimpose CG (virtual space image) on a captured moving image (real space image). The image capturing unit of the HMD acquires images at the positions of the right and left eyes of a wearer, and the display unit displays a stereo image to the eyes of the wearer. The PC receives the captured image captured by the HMD, generates a composite image by superimposing CG on the captured image, and transmits the composite image to the HMD. Particularly, by generating a three-dimensional CG image in the three-dimensional coordinate system of the real space defined based on the captured image and superimposing it on the captured image, it is possible to provide the wearer with an environment in which the real space and the virtual space are merged.

On the other hand, a VR system includes an HMD including a display unit, and a PC to render CG (virtual space image). In general, an HMD equipped with a posture sensor for detecting the posture (viewpoint position, line-of-sight direction, or the like) of the user is used. The posture data detected by the posture sensor of the HMD is transmitted to the PC, and the PC renders CG based on the posture data and transmits it to the HMD.

<Arrangement of Device>

Figure 1:
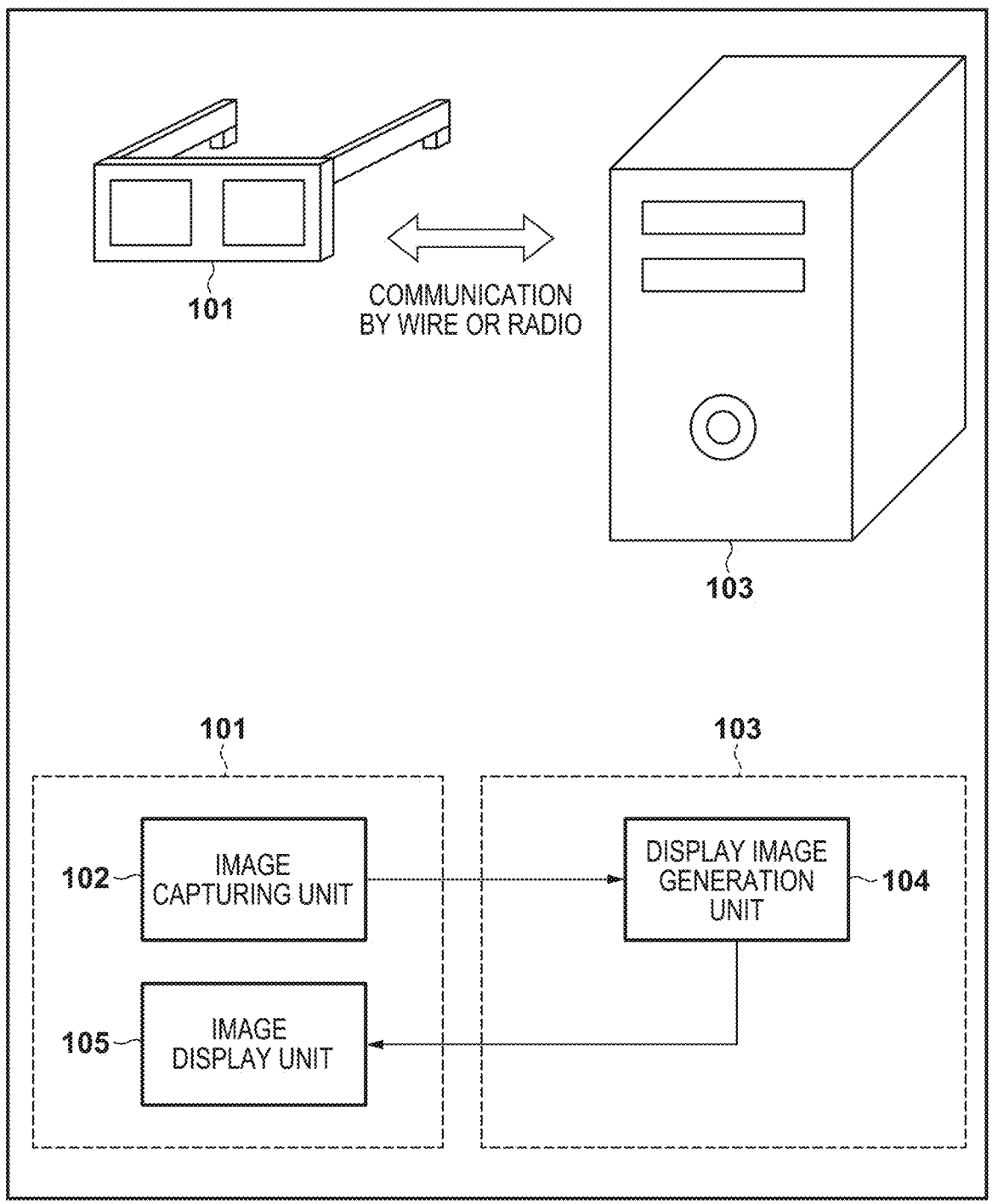
FIG. 1 is a view schematically showing the arrangement of an MR/VR system.

FIG. 1 is a view schematically showing the arrangement of the MR/VR system. This system can operate as either an MR system or a VR system. The MR/VR system includes an HMD 101 and a PC 103. The HMD 101 includes an image capturing unit 102 and an image display unit 105 as a given display unit, and the PC 103 includes a display image generation unit 104.

When the system operates as the MR system, an image captured by the image capturing unit 102 is transmitted to the PC 103, and the display image generation unit 104 superimposes CG on the captured image to generate a composite image (MR image). Then, the composite image is transmitted to the HMD 101, displayed on the image display unit 105, and provided to the wearer of the HMD 101.

On the other hand, when the system operates as the VR system, a posture sensor (acceleration/angular velocity sensor, or the like) is arranged instead of the image capturing unit 102, and detected posture data is transmitted to the PC 103. The display image generation unit 104 renders CG based on the posture data. The CG rendered by the display image generation unit 104 is transmitted to the HMD 101, displayed on the image display unit 105 of the HMD 101, and provided to the wearer of the HMD 101.

Note that in FIG. 1, the HMD 101 and the PC 103 connected thereto are shown as separate hardware components, but all the functions of the PC 103 can be implemented in the HMD 101 to form an integrated device.

Ideally, in the HMD in an MR/VR system, image capturing or posture data acquisition should be performed simultaneously with display of the MR/VR image generated based on the image capturing or posture data acquisition. However, in reality, there is a processing time for performing image processing on the captured image, arithmetic processing for CG rendering, and the like. Thus, when the posture of the user has changed (for example, when the head has moved), the display video displayed on the image display unit 105 correspondingly moves after the above-described processing time has elapsed after the change of the posture. Therefore, this gives the wearer (user) of the HMD 101 an uncomfortable feeling.

Figure 2:
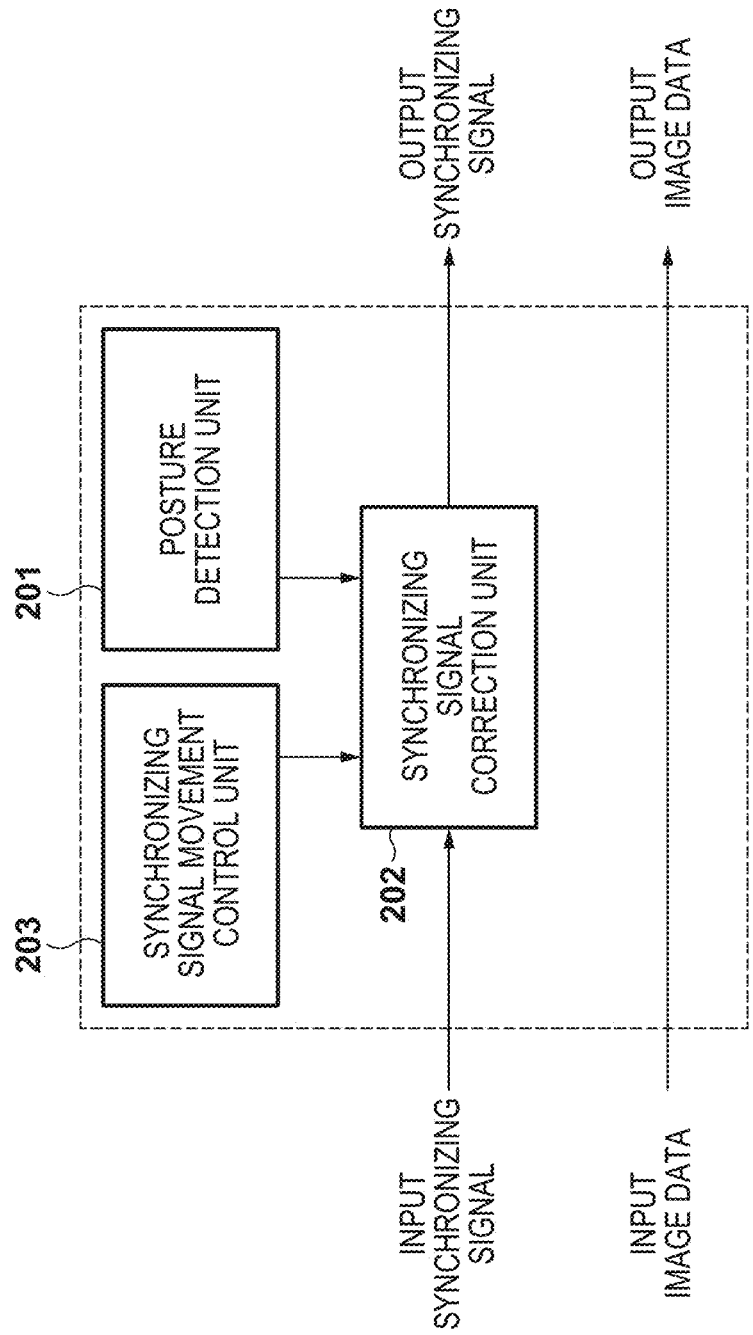
FIG. 2 is a functional block diagram of an image shift processing unit in the first and second embodiments.

FIG. 2 is a functional block diagram of an image shift processing unit in the first embodiment. The image shift processing unit is a function implemented between the display image generation unit 104 and the image display unit 105. Note that the specific location to implement the image shift processing unit may be in the PC 103 or the HMD 101, and is not particularly limited. For example, a posture detection unit 201, a synchronizing signal correction unit 202, and a synchronizing signal movement control unit 203 in the image shift processing unit may be distributed in the PC 103 and the HMD 101. Note that in the following description, it is assumed that the image shift processing unit is arranged at the latter stage in the display image generation unit 104.

The posture detection unit 201 is a functional unit that detects the posture of the wearer of the HMD 101 and determines an image shift amount. That is, the posture detection unit 201 outputs an image shift instruction instructing a change of the display position of a frame image to the synchronizing signal correction unit 202. Here, the posture of the HMD 101 is detected based on a signal from the posture sensor (acceleration/angular velocity sensor) equipped in the HMD 101. Note that the posture detection unit 201 only needs to be capable of detecting the posture of the HMD 101, so that it may be configured to detect the posture by a method, for example, using infrared rays or image analysis by a device arranged outside the HMD 101. Further, the posture detection unit 201 calculates, from the detected posture data, image shift amounts in the horizontal and vertical directions to prevent an uncomfortable feeling due to the above-described processing delay. More specifically, in order to reduce the delay amount perceived by the wearer (user) of the HMD 101, the image shift amount is controlled to increase as the posture change increases.

The synchronizing signal correction unit 202 is a functional unit that receives a horizontal synchronizing signal and a vertical synchronizing signal based on the image rendered by the display image generation unit 104, accepts the above-described image shift instruction, and performs correction processing for an image shift designated by the image shift instruction. The corrected synchronizing signal is output to the image display unit 105 in association with the image signal.

The synchronizing signal movement control unit 203 is a functional unit that controls the movement of the synchronizing signal to prevent image disturbance, and the detailed arrangement will be described later. The synchronizing signal correction unit 202 corrects the synchronizing signal based on the control by the synchronizing signal movement control unit 203 and the image shift amount calculated by the posture detection unit 201. That is, an output synchronizing signal is generated by shifting the timing of the input synchronizing signal by a period corresponding to the image shift amount.

<Operation of Device>

Figure 11:
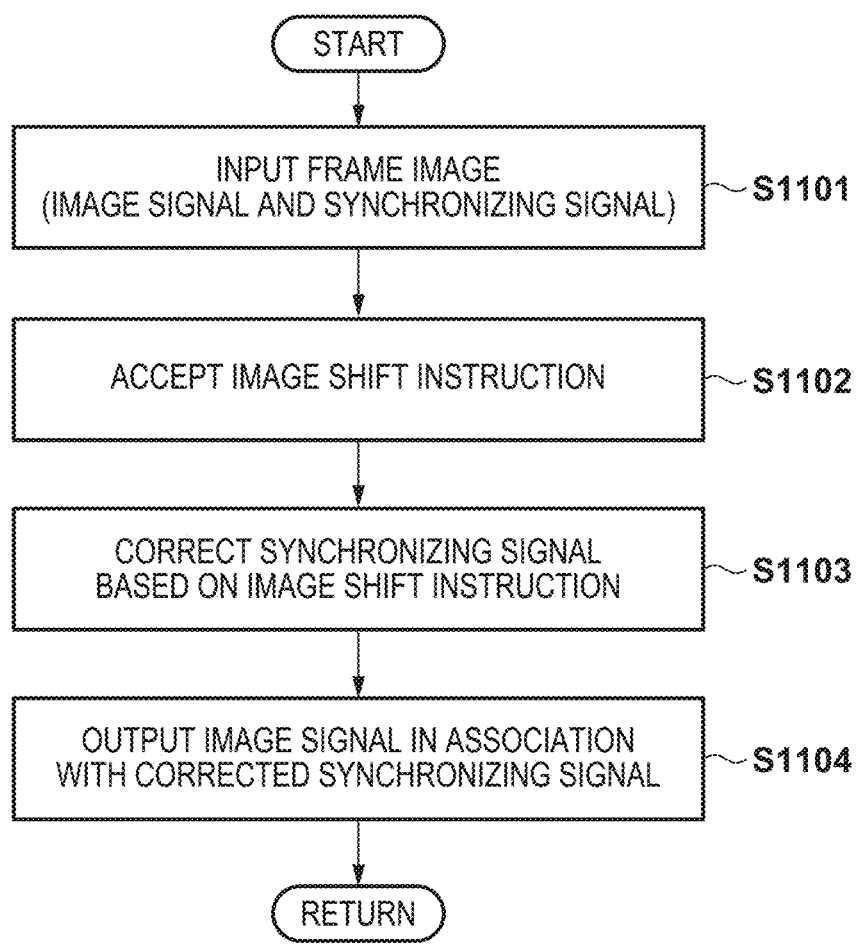
FIG. 11 is a flowchart illustrating a series of operations of the image shift processing unit.

FIG. 11 is a flowchart illustrating a series of operations of the image shift processing unit. As described above, the image shift processing unit is a function implemented in an arbitrary location between the display image generation unit 104 and the image display unit 105, and is assumed herein to be arranged at the latter stage in the display image generation unit 104.

In step S1101, the image shift processing unit receives, as an image signal and a synchronizing signal, a frame image constituting a moving image. That is, in this step, a frame image (image signal and synchronizing signal) generated at the former stage in the display image generation unit 104 is input.

In step S1102, the image shift processing unit accepts an image shift instruction instructing a change of the display position of the frame image in the vertical direction (a direction perpendicular to a line constituting the frame image) of the image display unit 105. For example, a movement amount (VSHIFT) in the vertical direction and a movement amount (HSHIFT) in the horizontal direction are accepted as the image shift instruction. Details will be described later with reference to FIG. 3.

In step S1103, the image shift processing unit corrects the synchronizing signal input in step S1101 based on the image shift instruction accepted in step S1102. Note that if the movement amount (VSHIFT) in the vertical direction included in the image shift instruction exceeds a predetermined amount, correction corresponding to an image shift amount equal to or less than the predetermined amount is performed. Details will be described later with reference to FIG. 3.

In step S1104, the image shift processing unit outputs the image signal input in step S1101 and the synchronizing signal corrected in step S1103 in association with each other.

Figure 3:
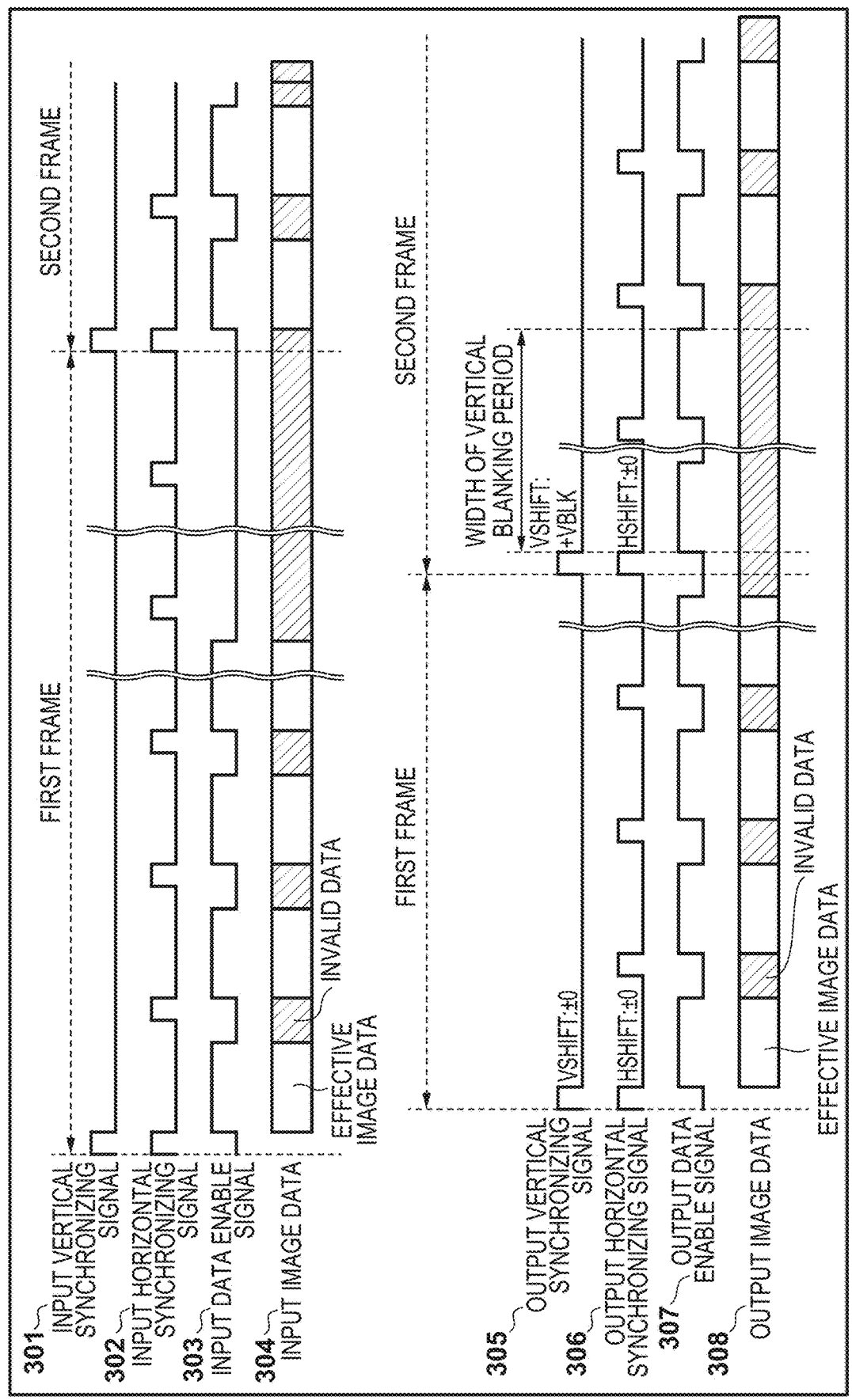
FIG. 3 is a view showing the operation of a synchronizing signal correction unit in the first embodiment.

FIG. 3 is a view showing the operation of the synchronizing signal correction unit 202 in the image shift processing unit in the first embodiment. More specifically, FIG. 3 is a timing chart showing the operation (S1103) of the synchronizing signal correction unit 202 based on the control (S1102) by the synchronizing signal movement control unit 203. Note that in the following description, the horizontal direction means a direction along a line constituting the frame image of the moving image, and the vertical direction a direction perpendicular to the line constituting the frame image.

An input vertical synchronizing signal 301 is a signal asserted at the start of the effective image area of each frame image, and an input horizontal synchronizing signal 302 is a signal asserted at the start of the effective image area of each image line constituting the frame image. Note that the effective image area corresponds to the period of the whole frame image excluding vertical and horizontal blanking periods.

An input data enable signal 303 is a signal asserted during the period of the effective image area. Input image data 304 is data of the image line constituting the frame image. The input image data 304 input during the period in which the input data enable signal 303 is asserted serves as effective image data.

The synchronizing signal correction unit 202 processes the above-described signals to implement an image shift, and outputs the respective signals as an output vertical synchronizing signal 305, an output horizontal synchronizing signal 306, an output data enable signal 307, and output image data 308.

FIG. 3 shows an example in a case in which no shift is performed in the first frame and a shift in the vertical direction is performed in the second frame. More specifically, the movement amount (VSHIFT) in the vertical direction and the movement amount (HSHIFT) in the horizontal direction are set to "0" in the first frame. On the other hand, in the second frame which is the subsequent frame image, the movement amount (VSHIFT) in the vertical direction is set to the width (VBLK) of the vertical blanking period in a downward direction.

Figure 4:
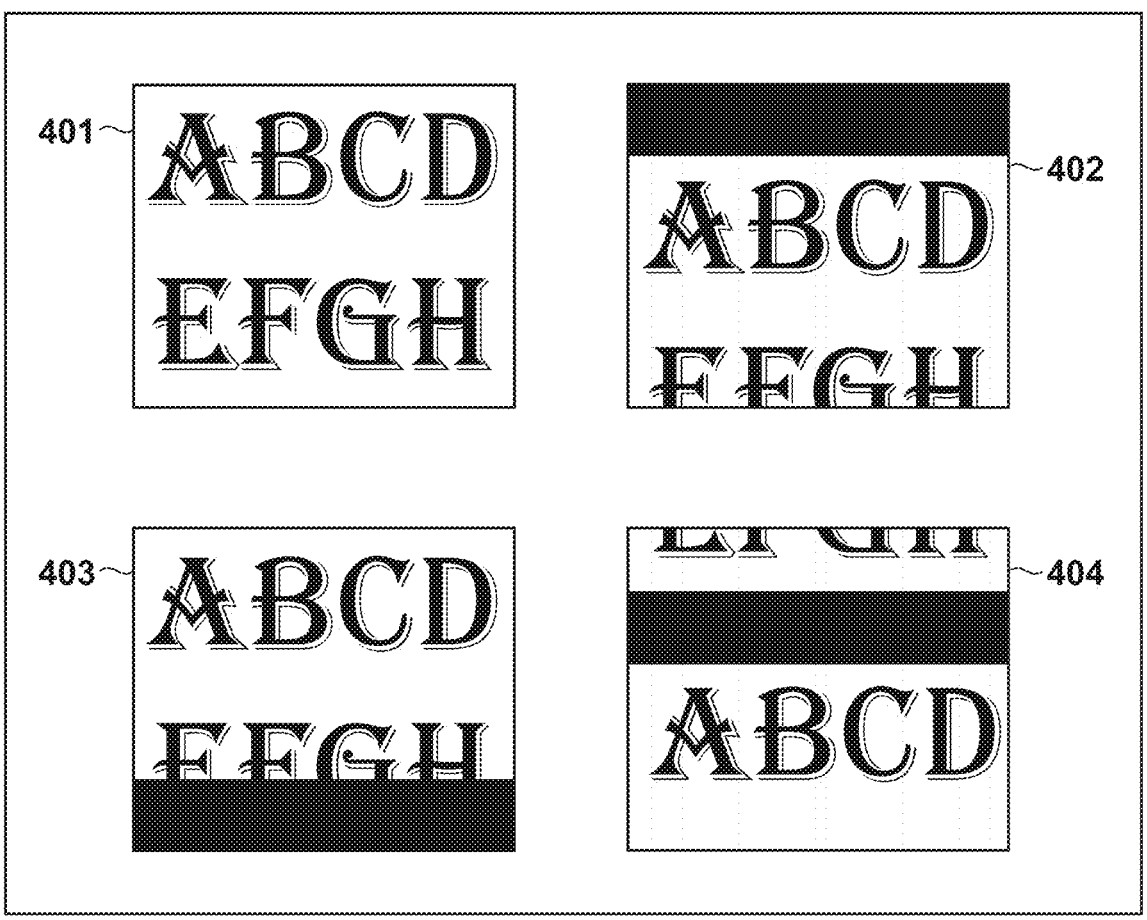
FIG. 4 is a view for explaining image shift processing in the first embodiment.

FIG. 4 is a view for explaining the image shift processing in the first embodiment.

An image 401 and an image 402 exemplarily show the first frame and the second frame, respectively, in a case of VSHIFT≤VBLK. The image 401 exemplarily shows the output image in the first frame shown in FIG. 3, in which the image shift amount is set to "0". On the other hand, the image 402 exemplarily shows the output image in the second frame shown in FIG. 3, in which an image shifted by VBLK in the vertical direction is output.

An image 403 and an image 404 exemplarily show the first frame and the second frame, respectively, in a case of VSHIFT>VBLK. As is understood from the timing chart shown in FIG. 3, if the movement amount (VSHIFT) in the vertical direction is set to a value (predetermined amount) exceeding the width (VBLK) of the vertical blanking period, image disturbance occurs. More specifically, as exemplified in the image 403, the lower portion of the effective image area is lost in the first frame. Further, as exemplified in the image 404, the image of the portion lost in the image 403 appears in the upper portion in the second frame. That is, a portion of the preceding frame image is mixed into the subsequent frame image.

In order to prevent the above-described image disturbance across the frames, the synchronizing signal movement control unit 203 in the first embodiment controls the movement amount in the vertical direction. More specifically, in accordance with the change amount (ΔV) of the vertical synchronizing signal movement amount calculated by the posture detection unit 201 between the continuous frames, the movement amount of the vertical synchronizing signal is controlled as follows.

If ΔV≤VBLK, the synchronizing signal correction unit 202 sets the movement amount (VSHIFT) in the vertical direction to ΔV. On the other hand, if ΔV>VBLK, the synchronizing signal correction unit 202 sets the movement amount (VSHIFT) in the vertical direction to VBLK. That is, the movement amount (VSHIFT) is controlled such that the upper limit of the movement amount (VSHIFT) in the vertical direction becomes VBLK (a value equal to or smaller than a predetermined amount).

With the above-described control, in the case of ΔV>VBLK, it is possible to prevent image disturbance across the frames exemplified in the images 403 and 404.

As described above, according to the first embodiment, in accordance with the change amount (ΔV) of the vertical synchronizing signal movement amount calculated by the posture detection unit 201 between the continuous frames, the movement amount in the vertical direction in an image shift is controlled. This enables generation of a display image giving a less uncomfortable feeling.

Second Embodiment

In the second embodiment, a form in which image shift processing in the horizontal direction is performed with image shift processing in the vertical direction will be described. The arrangement of an image shift processing unit and a series of operations thereof are almost the same as in the first embodiment (FIGS. 2 and 11), but are different from the first embodiment in that shift processing in the horizontal direction is further controlled.

<Operation of Device>

Figure 5:
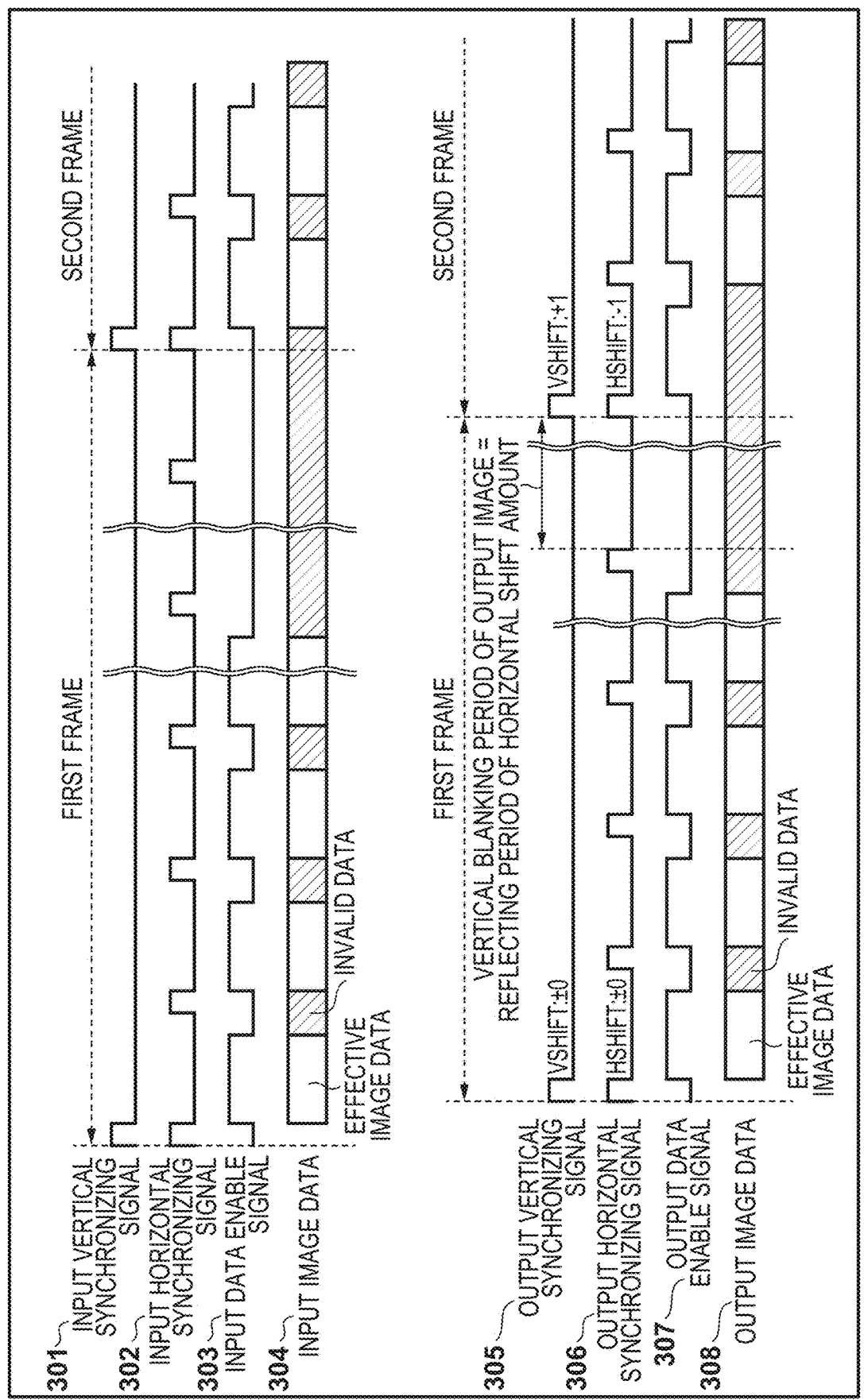
FIG. 5 is a view showing the operation of a synchronizing signal correction unit in the second embodiment.

FIG. 5 is a view showing the operation of a synchronizing signal correction unit 202 in the second embodiment. More specifically, FIG. 5 is a timing chart showing the operation of the synchronizing signal correction unit 202 based on the control by a synchronizing signal movement control unit 203. The functions of the respective signals are similar to those in the first embodiment, and the description thereof will be omitted.

FIG. 5 shows an example in a case in which no shift is performed in the first frame and a shift in the vertical direction and a shift in the horizontal direction are performed in the second frame. More specifically, the movement amount (VSHIFT) in the vertical direction and the movement amount (HSHIFT) in the horizontal direction are set to "0" in the first frame. On the other hand, in the second frame which is the subsequent frame image, the movement amount (VSHIFT) in the vertical direction is set to one line in a downward direction, and the movement amount (HSHIFT) in the horizontal direction is set to one pixel in a left direction.

Figure 6:
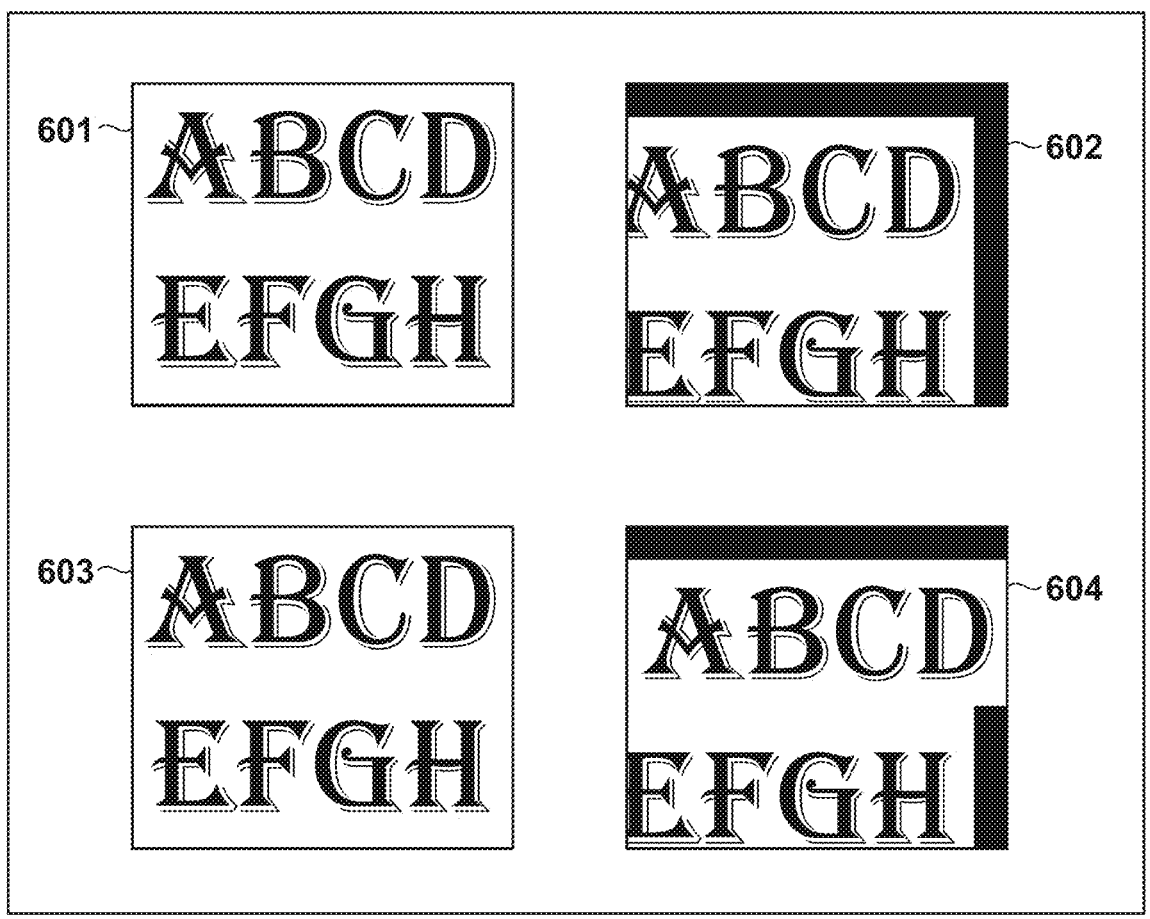
FIG. 6 is a view for explaining image shift processing in the second embodiment.

FIG. 6 is a view for explaining the image shift processing in the second embodiment.

An image 601 and an image 602 exemplarily show the first frame and the second frame, respectively, in a case in which the timing of changing the movement amount in the horizontal direction from "0" to "1" is set outside the effective image area of the second frame. On the other hand, an image 603 and an image 604 exemplarily show the first frame and the second frame, respectively, in a case in which the timing of changing the movement amount in the horizontal direction from "0" to "1" is set within the effective image area of the second frame.

That is, when the movement amount in the horizontal direction is changed at the timing within the effective image area, image deviation occurs in the middle of the image as exemplified in the image 604 in the second frame, resulting in image disturbance.

In order to prevent image disturbance due to the above-described image deviation, the synchronizing signal movement control unit 203 controls the timing of reflecting the movement amount in the horizontal direction. More specifically, the timing of reflecting the movement amount in the horizontal direction is controlled to be in a period other than the effective image area of each frame. That is, the timing is controlled such that the movement amount in the horizontal direction is reflected during the vertical blanking period of each frame.

As has been described above, according to the second embodiment, the synchronizing signal movement control unit 203 controls the change reflecting timing such that the movement amount in the horizontal direction does not change in the period of the effective image area of each frame. This enables generation of a display image giving a less uncomfortable feeling.

Third Embodiment

In the third embodiment, a form in which image disturbance caused by the image shift processing is reduced by image processing will be described. More specifically, an area in which image disturbance occurs is corrected with fixed image data (such as full black data composed of a black color alone) composed of a predetermined color, thereby generating a display image giving a less uncomfortable feeling.

<Arrangement of Device>

Figure 7:
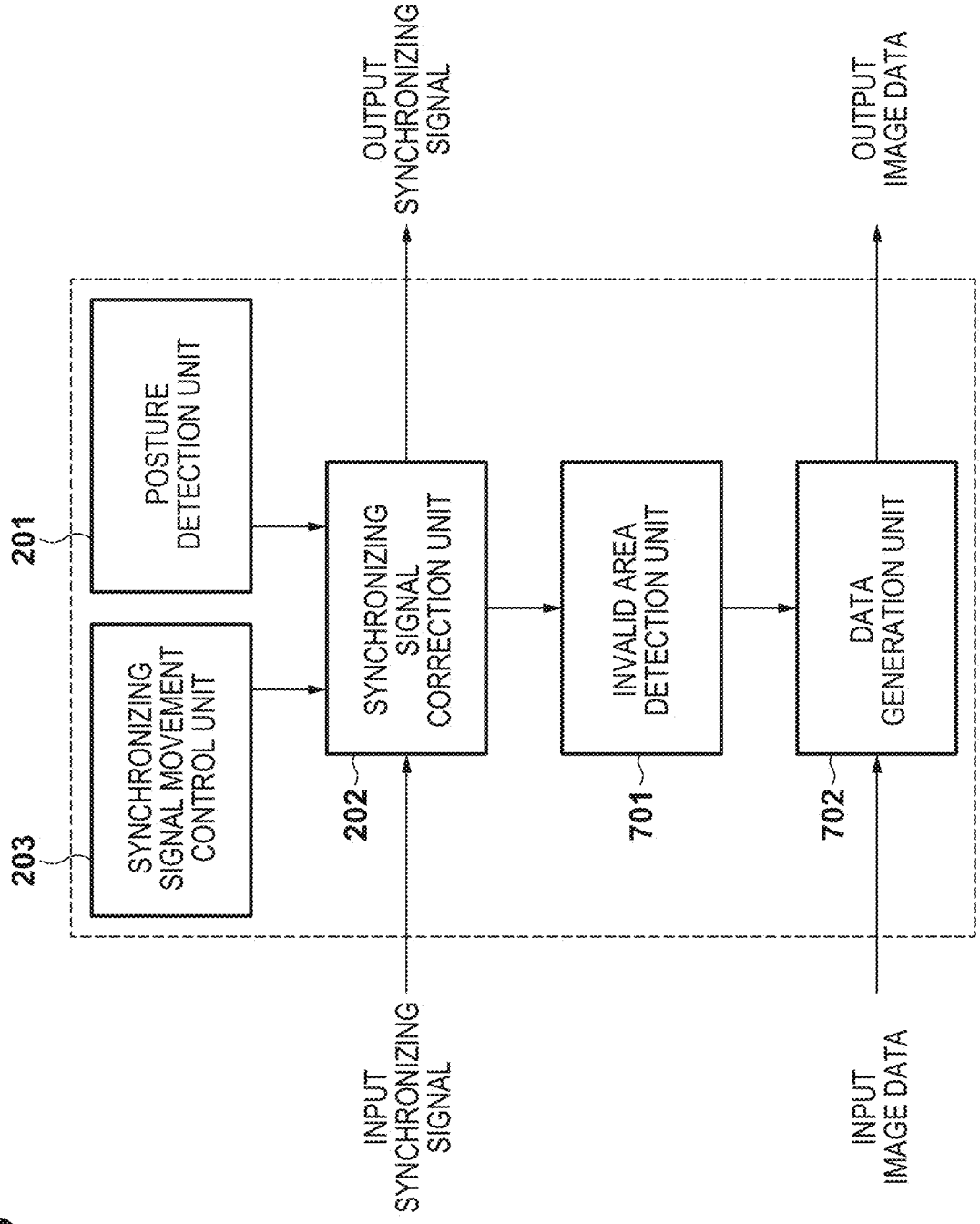
FIG. 7 is a functional block diagram of an image shift processing unit in the third embodiment.

FIG. 7 is a functional block diagram of an image shift processing unit in the third embodiment. An invalid area detection unit 701 and a data generation unit 702 are added to the arrangement in the above-described first embodiment. The remaining part of the arrangement is similar to that in the first embodiment, and the description thereof will be omitted.

The invalid area detection unit 701 is a functional unit that detects the invalid area of a related image based on the operation of a synchronizing signal correction unit 202. Here, an "invalid area" indicates a portion of an image frame after the image shift processing other than the valid area of the image frame before the image shift processing. In other words, an invalid area indicates an area (period) other than the image area (post-shifting valid area) obtained by subtracting the movement amount by the image shift processing from the effective image area.

The data generation unit 702 is a functional unit that corrects an image in a detected invalid area to prevent image disturbance. More specifically, based on the detection result of an invalid area by the invalid area detection unit 701, the data generation unit 702 generates an image signal of fixed image data (for example, full black data) as an interpolation image signal in the invalid area.

<Operation of Device>

FIG. 12 is a flowchart illustrating a series of operations of the image shift processing unit. Note that processing in steps S1201 to S1203 is similar to that in steps S1101 to S1103, and the description thereof will be omitted.

In step S1204, the image shift processing unit detects, based on a corrected synchronizing signal corrected in step S1203, an invalid area in an image signal related to the corrected synchronizing signal. Details will be described later with reference to FIG. 8.

In step S1205, the image shift processing unit generates an interpolation image signal in the period of the invalid area. Details will be described later with reference to FIGS. 8 and 9.

In step S1206, the image shift processing unit outputs the interpolation image signal generated in step S1205 and the synchronizing signal corrected in step S1203 in association with each other.

Figure 8:
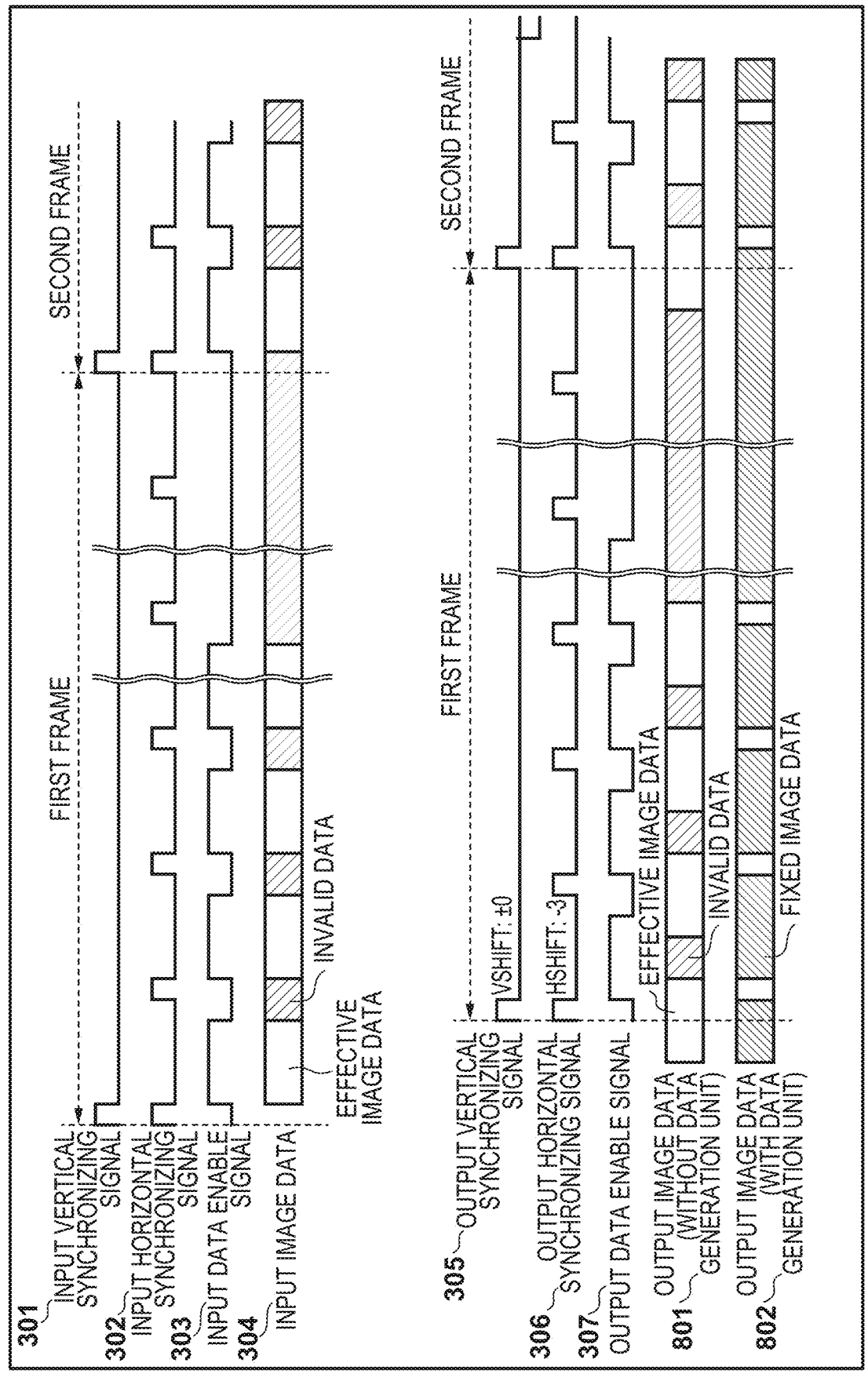
FIG. 8 is a view showing the operation of a synchronizing signal correction unit in the third embodiment.

FIG. 8 is a view showing the operation of the synchronizing signal correction unit 202 in the image shift processing unit in the third embodiment. More specifically, FIG. 8 is a timing chart showing the operation (S1205) of the data generation unit 702 based on the control (S1204) by the invalid area detection unit 701, and the operation (S1203) of the synchronizing signal correction unit 202.

The functions of signals 301 to 307 are similar to those in the first embodiment, and the description thereof will be omitted. FIG. 8 shows an example in a case in which, in both the first frame and the second frame, the movement amount (VSHIFT) in the vertical direction is set to "0" (that is, no movement), and the movement amount (HSHIFT) in the horizontal direction is set to "−3" (three pixels in a left direction).

A signal 801 exemplarily shows output image data when no image processing is performed in the data generation unit 702, and is similar to the signal 308. On the other hand, a signal 802 exemplarily shows output image data when image processing is performed in the data generation unit

702. In the signal 802, portions (portions corresponding to the invalid areas) of the image signal are overwritten with fixed image data (for example, full black data).

Figure 9:
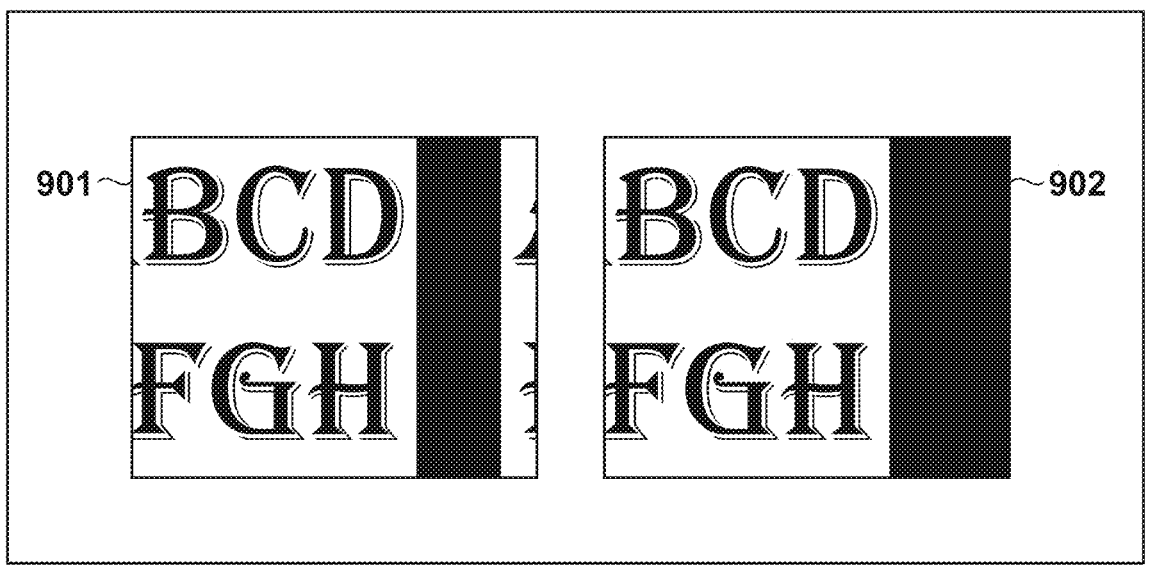
FIG. 9 is a view for explaining image shift processing in the third embodiment.

FIG. 9 is a view for explaining the image shift processing in the third embodiment.

An image 901 exemplarily shows an output image in each of the first frame and the second frame displayed when no image processing is performed in the data generation unit 702. It can be seen that image disturbance occurs in the right end portion of the image 901 due to folding of the data of the subsequent line. That is, the image in the left end portion of the (n+1)th line before the image shift processing is mixed in the right end portion of the nth line after the image shift processing.

On the other hand, an image 902 exemplarily shows an output image of each of the first frame and the second frame displayed when the image processing is performed in the data generation unit 702. In the image 902, fixed image data (here, full black data) is displayed in the right end portion of the image. That is, it can be seen that the image disturbance (folding display) that has occurred in the image 901 is appropriately reduced.

As has been described above, according to the third embodiment, image correction is performed in which image disturbance (folding display) mixed in by the image shift processing is filled with fixed image data. This enables generation of a display image giving a less uncomfortable feeling.

Modification

In the above-described third embodiment, image correction is performed in which an invalid area is filled with fixed image (single-color) data. However, the invalid area may be corrected using another image. In the modification, a form in which more natural-looking image is generated in the data generation unit 702.

<Data Generation Unit>

In order to achieve more natural-looking image interpolation, the data generation unit 702 includes a one-line RAM for holding image data. In each line, if it includes a "post-shift valid area" described in the third embodiment, data to overwrite an invalid area is generated using the image data in the left or right end of the post-shift valid area. That is, an image signal based on the pixel value of the post-shift valid area contacting the invalid area is generated. On the other hand, if the image line does not include a post-shift valid area, the data of an invalid area is complemented using the image data of one line in the upper or lower end of the post-shift valid area.

Note that an image that is perceived to be more natural by a user can be generated by further considering the luminance of the image displayed in the invalid area. For example, if the frame member of the display unit in the HMD 101 is black, by adding processing (gradation processing) that lowers the luminance (brings the luminance closer to black) as approaching the edge of the image, the image is perceived by the user as a more natural image.

Figure 10:
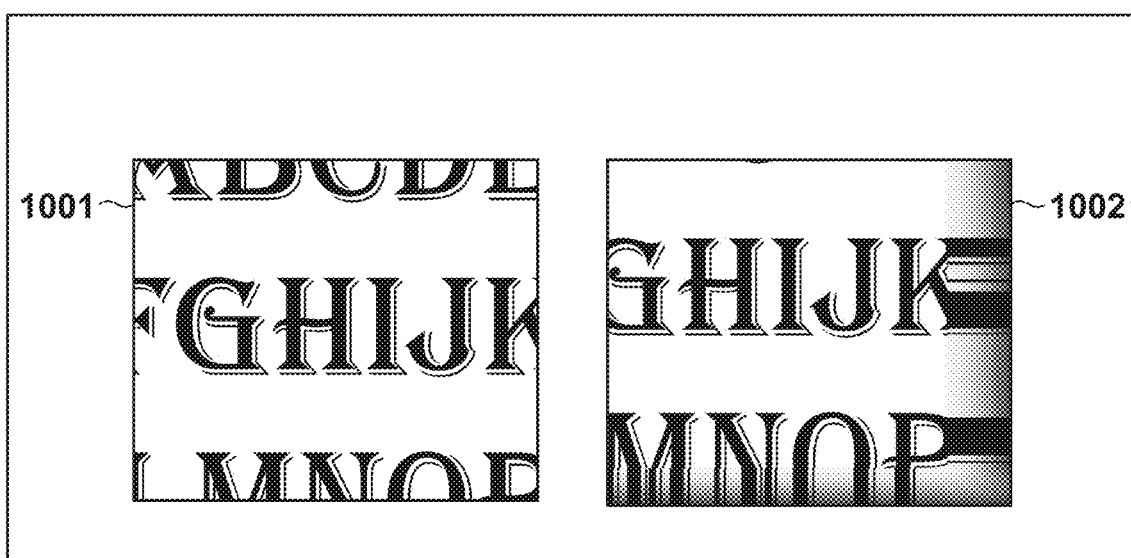
FIG. 10 is a view for explaining the image shift processing in a modification.

FIG. 10 is a view for explaining the image shift processing in the modification. An image 1001 exemplarily shows an image before the image shift processing. An image 1002 exemplarily shows an output image displayed when the image shift processing is performed on the image 1001 in the data generation unit 702 according to the modification. In the image 1002, data interpolation and luminance adjustment are performed in the invalid area. Note that the interpolation image reflected in the invalid area is not limited to the interpolation images described above, and any interpolation image that relaxes an uncomfortable feeling of the user can be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing device comprising:
   one or more processors; and
   one or more memories coupled to the one or more processors, the one or more memories having stored therein instructions which, when executed by the one or more processors, cause the image processing device to:
   (1) receive an image signal and a synchronizing signal, the image signal and the synchronizing signal corresponding to a frame image of a moving image;
   (2) accept an image shift instruction instructing a change of a display position of the frame image in a vertical direction of a display device;
   (3) correct the synchronizing signal on the basis of the image shift instruction; and
   (4) output the image signal and the corrected synchronizing signal in association with each other,
   wherein in the correcting, if an instructed image shift amount in the vertical direction included in the image shift instruction exceeds a predetermined amount, the synchronizing signal is corrected in correspondence with an image shift amount not more than the predetermined amount.

2. The image processing device according to claim 1, wherein the predetermined amount is a width of a vertical blanking period in the frame image.

3. The image processing device according to claim 1, wherein the image shift instruction includes an instruction of an image shift in a horizontal direction.

4. The image processing device according to claim 3, wherein the correcting includes performing, in a period excluding a valid image area in the frame image, correction of the synchronizing signal related to the image shift in the horizontal direction.

5. The image processing device according to claim 3, wherein the correcting includes performing, during a vertical blanking period, correction of the synchronizing signal related to the image shift in the horizontal direction.

6. The image processing device according to claim 1, wherein the instructions, when executed by the one or more processors, further cause the image processing device to:
(a) detect, based on the corrected synchronizing signal, an invalid area in the image signal associated with the corrected synchronizing signal; and
(b) generate an interpolation image signal in a period of the invalid area.

7. The image processing device according to claim 6, wherein the generating generates an image signal corresponding to a predetermined color as the interpolation image signal.

8. The image processing device according to claim 7, wherein the predetermined color is black.

9. The image processing device according to claim 6, wherein the generating generates, as the interpolation image signal, an image signal based on a pixel value of an image area contacting the invalid area.

10. The image processing device according to claim 6, wherein the generating generates the interpolation image signal for each image line.

11. The image processing device according to claim 10, wherein if the image line includes a valid area, the generating generates, as the interpolation image signal, an image signal based on a pixel value of a valid area contacting the invalid area.

12. The image processing device according to claim 10, wherein if the image line does not include a valid area, the generating generates, as the interpolation image signal, an image signal based on a pixel value in an end portion of the valid area.

13. The image processing device according to claim 6, wherein the generating generates the interpolation image signal by performing gradation processing such that luminance changes toward an end of a frame image.

14. The image processing device according to claim 1, wherein the image processing device is configured to detect a posture of the display device, and
wherein the correcting corrects the synchronizing signal based on the detected posture.

15. The image processing device according to claim 14, wherein the correcting includes calculating the image shift amount based on a change amount of the detected posture.

16. The image processing device according to claim 15, wherein the calculating increases the image shift amount as the change amount of the detected posture increases.

17. The image processing device according to claim 14, wherein the image processing device detects the posture of the display device using a posture sensor provided in the display device.

18. The image processing device according to claim 1, wherein the image processing device is connected to a head mounted display (HMD) including the display device.

19. A control method for an image processing device that performs image processing on a frame image of a moving image, the method comprising:
receiving an image signal and a synchronizing signal, the image signal and the synchronizing signal corresponding to the frame image of the moving image;
accepting an image shift instruction instructing a change of a display position of the frame image in a vertical direction of a display device;
correcting the synchronizing signal on the basis of the image shift instruction; and
outputting the image signal and the corrected synchronizing signal in association with each other,
wherein, in the correcting, if an instructed image shift amount in the vertical direction included in the image shift instruction exceeds a predetermined amount, the synchronizing signal is corrected in correspondence with an image shift amount not more than the predetermined amount.

* * * * *